US012567103B1

(12) United States Patent
Huang

(10) Patent No.: US 12,567,103 B1
(45) Date of Patent: Mar. 3, 2026

(54) DISPLAY CUSTOMIZATION SYSTEM FOR 3D MODEL SHOPPING INTERFACE

(71) Applicant: Beijing Dushanqimei Brand Operation Co., Ltd., Beijing (CN)

(72) Inventor: Rengu Huang, Beijing (CN)

(73) Assignee: Beijing Dushanqimei Brand Operation Co., Ltd., Beijing (CN)

( * ) Notice: Subject to any disclaimer, the term of this patent is extended or adjusted under 35 U.S.C. 154(b) by 0 days.

(21) Appl. No.: 19/272,858

(22) Filed: Jul. 17, 2025

(30) Foreign Application Priority Data

Nov. 1, 2024 (CN) .......................... 202411547226.3

(51) Int. Cl.
G06Q 30/00 (2023.01)
G06Q 30/0601 (2023.01)
(52) U.S. Cl.
CPC . G06Q 30/06434 (2025.08); G06Q 30/06212 (2025.08)
(58) Field of Classification Search
CPC ................. G06Q 30/0601–0645; G06Q 30/08
See application file for complete search history.

(56) References Cited

U.S. PATENT DOCUMENTS

| | | | | |
|---|---|---|---|---|
| 2011/0125614 A1* | 5/2011 | Dollens | .............. | G06Q 30/0643 |
| | | | | 705/27.2 |
| 2014/0201024 A1* | 7/2014 | Collier | ............... | G06Q 30/0635 |
| | | | | 705/26.5 |
| 2014/0358877 A1* | 12/2014 | Hsiao | ...................... | G06F 16/51 |
| | | | | 707/695 |
| 2015/0006313 A1* | 1/2015 | Beaver | ............... | G06Q 30/0643 |
| | | | | 705/26.5 |

(Continued)

FOREIGN PATENT DOCUMENTS

| | | |
|---|---|---|
| CA | 2621488 A1 | 3/2007 |
| CN | 107895312 A | 10/2018 |
| CN | 112991558 A | 6/2021 |

(Continued)

OTHER PUBLICATIONS

Jiang Z. et al., "Web Prefetching in a Mobile Environment", IEEE Personal Communications, IEEE Communications Society, vol. 5, No. 5, Oct. 1, 1998, pp. 25-34; accessed at [https://www.lk.cs.ucla.edu/data/files/Jiang/Web%20Prefetching%20in%20a%20Mobile%20Environment.pdf] (Year: 1998).*

*Primary Examiner* — Jeffrey A. Smith
*Assistant Examiner* — Lindsay B Smith
(74) *Attorney, Agent, or Firm* — Birchwood IP

(57) ABSTRACT

The invention proposes a display method and customization system for a 3D model shopping interface. The method comprises the following steps: S100: display at least one candidate shopping target in response to shopping search keywords entered by the user; S200: enter a 3D model shopping display interface in response to the user's selection of the first candidate shopping target; S300: download a first data packet from the server if the first interactive operation of the user on a first local position is detected; S400: parse the first data packet and display the parsing result thereof if no second interactive operation of the user on the second local position is detected during the period from the start of downloading the first data packet to the completion of downloading. The customization system is configured with a 3D model shopping application. The invention can reduce lag and delay and adapt to user devices.

1 Claim, 7 Drawing Sheets

(56)          References Cited

U.S. PATENT DOCUMENTS

2015/0110457  A1      4/2015  Abecassis
2018/0300789  A1*  10/2018  Li  ......................... G06F 16/951
2022/0108042  A1*    4/2022  Bowen  .................. G06V 40/10

FOREIGN PATENT DOCUMENTS

CN          116033224  A      4/2023
CN          118695027  A      9/2024

* cited by examiner

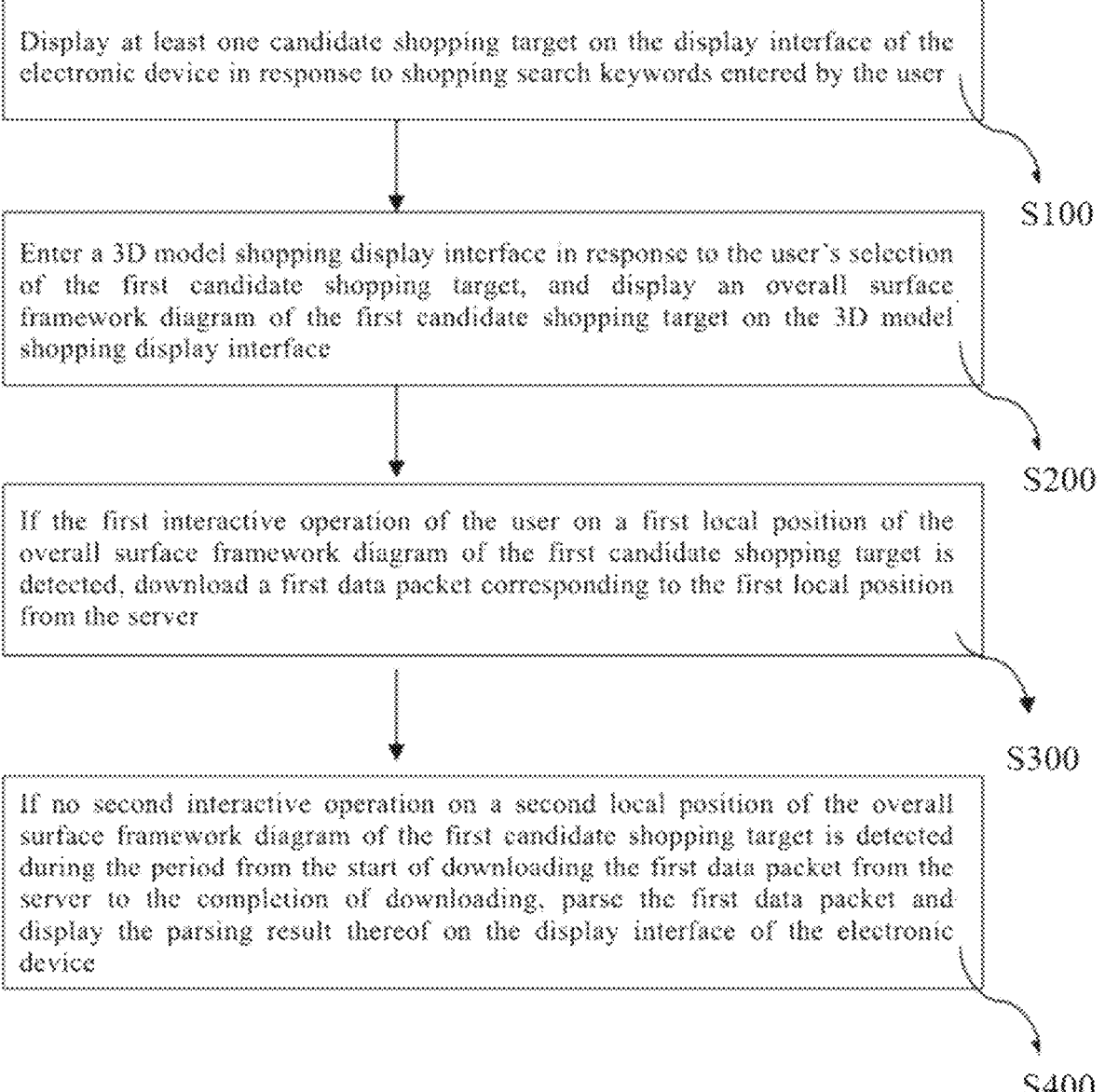

Display at least one candidate shopping target on the display interface of the electronic device in response to shopping search keywords entered by the user

S100

Enter a 3D model shopping display interface in response to the user's selection of the first candidate shopping target, and display an overall surface framework diagram of the first candidate shopping target on the 3D model shopping display interface

S200

If the first interactive operation of the user on a first local position of the overall surface framework diagram of the first candidate shopping target is detected, download a first data packet corresponding to the first local position from the server

S300

If no second interactive operation on a second local position of the overall surface framework diagram of the first candidate shopping target is detected during the period from the start of downloading the first data packet from the server to the completion of downloading, parse the first data packet and display the parsing result thereof on the display interface of the electronic device

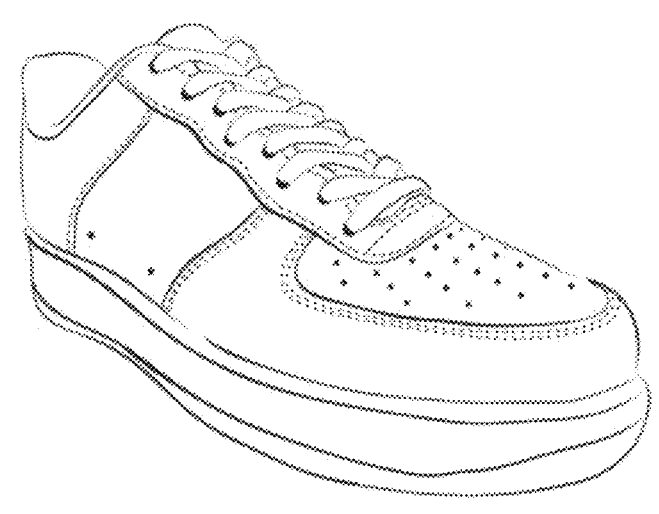
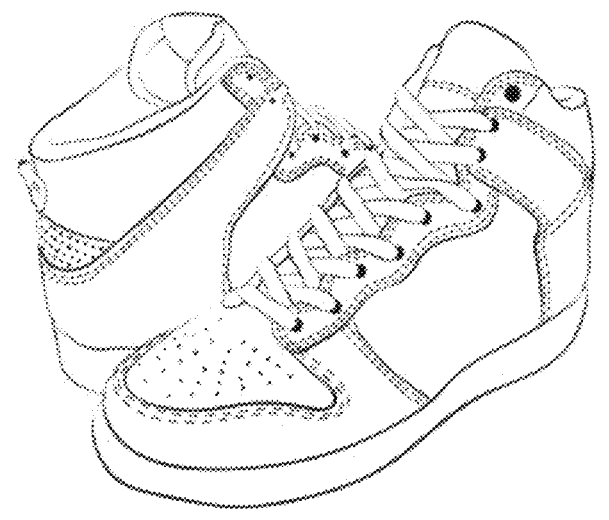
FIG. 3

DISPLAY CUSTOMIZATION SYSTEM FOR 3D MODEL SHOPPING INTERFACE

CROSS-REFERENCE TO RELATED APPLICATIONS

This application claims priority to Chinese Patent Application No. 202411547226.3, filed on Nov. 1, 2024, which is hereby incorporated by reference in its entirety.

TECHNICAL FIELD

The invention belongs to the field of information interaction and presentation technology, and particularly relates to a display method and customization system for a 3D model shopping interface, a computer-readable storage medium for implementing the method, a computer program product and an electronic device.

BACKGROUND ART

With the development of the internet, increasingly diverse product presentation solutions have emerged, evolving from text to images, and from images to videos, constantly upgrading people's experience of products. For example, Web 3D technology enables the direct presentation of 3D products on web pages, allowing 360-degree viewing. Moreover, through rich interactions, one can experience different configurations and highlight presentation of the products. Compared to traditional graphic/2D designs, 3D design uses three-dimensional space to create images or models with stereoscopic effects, giving users an immersive experience and a sense of pleasure.

The Chinese invention patent application CN201711298067.8 proposes an AR technology based online shopping experience system, which presents AR augmented reality in different ways according to the obtained product information and the actual application scenarios, allows users to have a comprehensive understanding of relevant information such as production process, transportation process and sales process of goods and find reliable products, and helps merchants build high-quality brands. This technology requires AR presentation devices to display 3D effects in AR form.

Compared to the traditional single-dimensional information presentation such as text, pictures and videos, 3D model shopping requires multi-dimensional and multi-angle information display as well as interaction with users' interactive operations. Therefore, the volume of data to be transmitted and processed are is large, and the types of data are more diverse and complex. However, the available resources of the electronic devices used by the user side are different and constantly changing. The unified loading and constant parsing data processing and display method not only brings significant processing pressure to the system but also leads to obvious lag and delay in data processing and display, results in a lower conversion rate of the actual shopping target group in shopping scenarios that pursue user visual experience, and fails to reflect the advantages of 3D model shopping as an emerging technology.

SUMMARY OF THE INVENTION

In view of the above technical problems, the invention proposes a display method and customization system for a 3D model shopping interface, a computer-readable storage medium for implementing the method, a computer program product and an electronic device, which can reduce the lag and delay phenomena in the interactive display of the 3D model shopping interface, adapt to user devices and thereby enhance the user's shopping experience.

The first aspect of the invention proposes a display system for a 3D model shopping interface, presenting a 3D model shopping interface through an APP, characterized in that the display system further comprises the following steps:

a 3D display component, which is used to display a 3D stereoscopic rotatable structure picture of a candidate shopping target;

a touch interactive click component, which comprises a first alternating switching component and a second selective component;

when the first alternating switching component is clicked, pairing effects of the candidate shopping target in at least two different states are alternately displayed on the shopping interface;

the second selective component comprises nine-grid display sub-components, each of which corresponds to a recommended color matching mode or a custom color matching mode;

when one of the display sub-components is clicked, the display effect of the candidate shopping target in the corresponding color matching mode corresponding to the display sub-component is displayed on the shopping interface;

the display system also comprises a candidate shopping target interaction detection component;

the candidate shopping target interaction detection component is used to detect the user interaction on the local position of an overall surface framework diagram of the candidate shopping target;

if the first interactive operation of the user on the first local position of the overall surface framework diagram of the first candidate shopping target is detected, the APP starts downloading the first data packet corresponding to the first local position from the server;

if no second interactive operation of the user on the second local position of the overall surface framework diagram of the first candidate shopping target is detected during the period from the start of downloading the first data packet from the server to the completion of downloading, the first data packet is parsed and the parsing result thereof is displayed on the display interface of the APP.

The second aspect of the invention proposes a display method for a 3D model shopping interface, which is applied to an electronic device and comprises the following steps:

S100: display at least one candidate shopping target on the display interface of the electronic device in response to shopping search keywords entered by the user;

S200: enter a 3D model shopping display interface in response to the user's selection of the first candidate shopping target, and display an overall surface framework diagram of the first candidate shopping target on the 3D model shopping display interface;

S300: if the first interactive operation of the user on a first local position of the overall surface framework diagram of the first candidate shopping target is detected, download a first data packet corresponding to the first local position from the server;

S400: if no second interactive operation on a second local position of the overall surface framework diagram of the first candidate shopping target is detected during the period from the start of downloading the first data packet from the server to the completion of downloading, parse the first data packet and display the parsing result thereof on the display interface of the electronic device.

The overall surface framework diagram is a 3D framework vector diagram of the candidate shopping target, and the 3D framework vector diagram only shows the surface appearance vector data diagram of the candidate shopping target.

The first interactive operation of the user on the first local position of the overall surface framework diagram of the first candidate shopping target in S300 includes zooming operation after the user clicks on the first local position, rotation operation after the user hits the first local position, and dragging operation of the user on the first local position.

The 3D framework vector diagram comprises a plurality of vector structure points; each vector structure point corresponds to at least one data packet to be parsed;

in S300, downloading the first data packet corresponding to the first local position from the server specifically comprises the following steps:

determine target vector structure points based on the first local position;

determine the data packets to be parsed for the target vector structure points from the server;

determine the first data packet from the data packets to be parsed based on the current resource configuration of the electronic device;

start downloading the first data packet.

The step S400 also comprises the following steps:

if the second interactive operation of the user on the second local position of the overall surface framework diagram of the first candidate shopping target is detected during the period from the start of downloading the first data packet from the server to the completion of downloading, download the second data packet corresponding to the second local position while continuing to download the first data packet;

if no second interactive operation of the user on a third local position of the overall surface framework diagram of the first candidate shopping target is detected during the period from the start of downloading the second data packet from the server to the completion of downloading, parse the second data packet and display the parsing result thereof on the display interface of the electronic device.

Part or all of the steps of the display method for the 3D model shopping interface in the second aspect can be automatically realized through various forms of electronic devices and computer program instructions; the computer program instructions can be stored in different forms of storage media and loaded into a computer electronic device for execution.

When the computer electronic device is used for implementation based on computer program instructions, the third aspect of the invention can be implemented in the following pseudo-code language form of the computer program:

S710: display K candidate shopping targets $\{Om_1, Om_2, \ldots, Om_k\}$ on the display interface of the electronic device in response to the shopping search keywords entered by the user, and k>1;

S720: enter the 3D model shopping display interface in response to the user's selection of the candidate shopping target $Om_i$, and display the overall surface framework diagram $SK_i$ of the candidate shopping target $Om_i$ on the 3D model shopping display interface; $1 \leq i \leq k$;

the overall surface framework diagram $SK_i$ comprises N vector structure points $\{Vp_{i1}, Vp_{i2}, \ldots, Vp_{iN}\}$; each vector structure point $Vp_{ij}$ corresponds to at least one data packet to be parsed, and each data packet to be parsed corresponds to different levels of hardware resource configuration; $1 \leq j \leq N$.

S730: judge whether the user has any interactive operation on the local positions of the overall surface framework diagram $SK_i$ of the candidate shopping target $Om_i$.

if any, take the local position as the current target position and proceed to S740;

if not, proceed to S760;

S740: start downloading the target data packet corresponding to the current target position from the server;

S750: return to execute S730 during the download of the target data packet;

S760: parse at least one of the target data packets and display the parsing result thereof on the display interface of the electronic device; the parsing result includes a local 3D model detail map for the candidate shopping target $Om_i$ at the current target position.

the step S750 also comprises the following step:

skip to S760 after the target data packets are downloaded.

To achieve the display method for the 3D model shopping interface in the second or third aspect, the fourth aspect of the invention proposes a customization system for a 3D model shopping interface, the customized system is configured with a 3D model shopping application, which is installed on an electronic device for displaying the 3D model shopping interface and realizes the display method for the 3D model shopping interface in the second or third aspect.

The fifth aspect of the invention also provides a computer-readable storage medium for storing computer instructions. When the computer instructions are executed on an electronic device, the electronic device performs the display method for the 3D model shopping interface in the third or second aspect.

The sixth aspect of the invention also proposes an electronic device, which comprises a processor and a memory. The memory is used to store instructions, and the processor is used to call the instructions in the memory, allowing the electronic device to perform the display method for the 3D model shopping interface in the third or second aspect.

The seventh aspect of the invention also proposes a computer program product, which comprises a computer program. When the computer program is executed, the display method for the 3D model shopping interface in the third or second aspect is implemented.

In the technical proposal of the invention, the overall surface framework diagram in the form of vector diagram in the initial stage only shows the vector data diagram of the surface appearance of the first candidate shopping target, so that the data loading speed is faster, and no burrs occur when the user subsequently zoom in and rotate the structure diagram. If the user's need to observe multiple details is continuously detected (but it is not sure which local position the user ultimately needs to observe), the above-mentioned method of the invention merely continuously downloads data and does not rush to perform data parsing and display, thus saving the repetitive data parsing and display process. If the user's interactive operation has stopped, it means that the user has determined exactly which position they need to observe. Therefore, only the data that has been downloaded at the corresponding local position is parsed and displayed, making the finally displayed result more in line with the user's current expectations and reducing the delay and lag in data interactive display.

The further advantages of the invention will be further elaborated in detail in the embodiments in combination with the drawings of the specification.

BRIEF DESCRIPTION OF THE DRAWINGS

To more clearly describe the technical proposals in the embodiments of the invention or the prior art, the drawings required for use in the embodiments are briefly introduced below. Obviously, the drawings described below are merely some embodiments of the invention. Those of ordinary skill in the art can obtain other drawings based on these drawings without creative effort.

FIG. 1 is a main process diagram of a display method for a 3D model shopping interface in an embodiment of the invention.

FIG. 3 is an overall surface framework diagram of a candidate shopping target at different angles in the technical proposal of the invention.

DETAILED DESCRIPTION OF THE INVENTION

Figure 2:
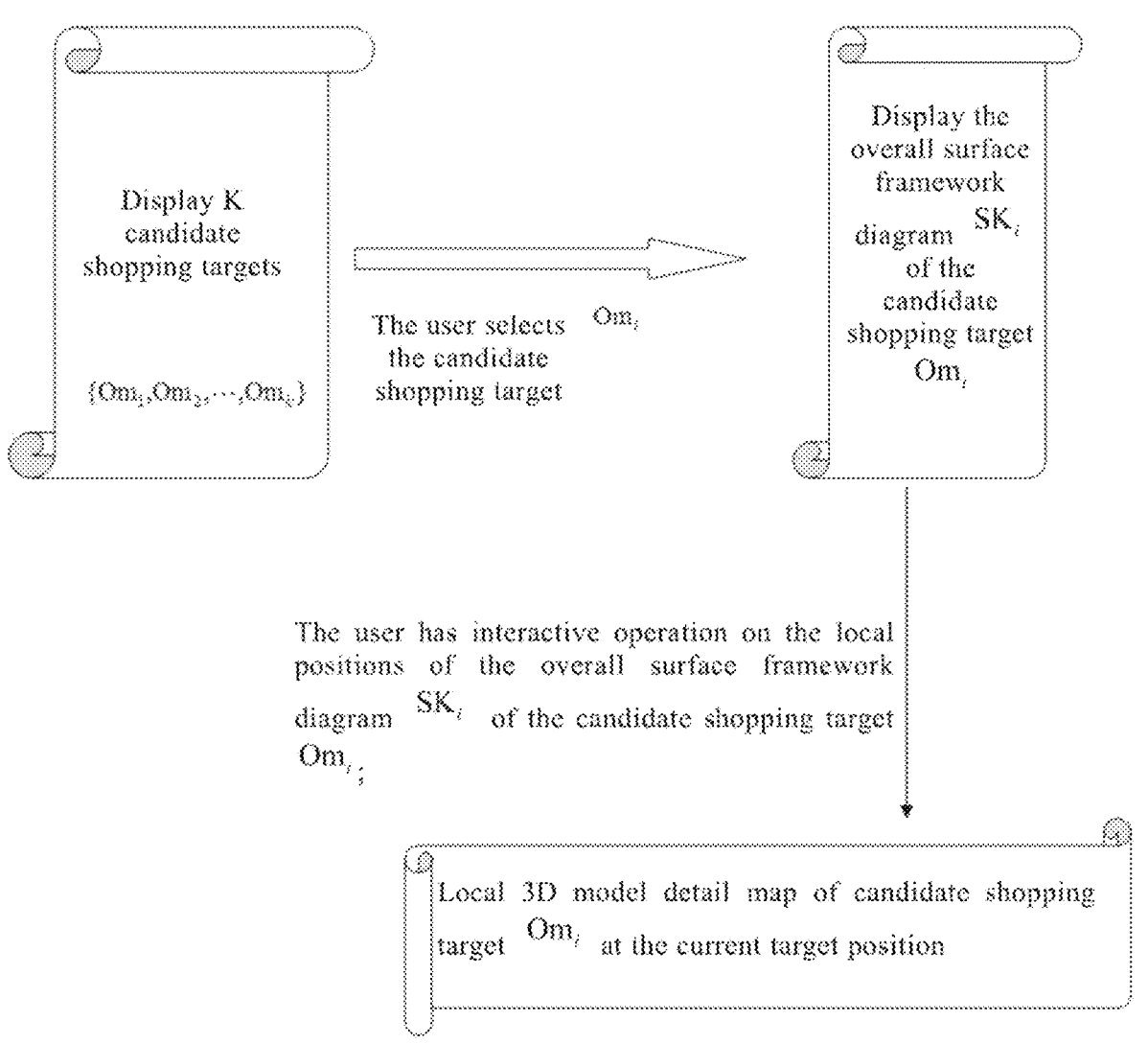
FIG. 2 is a user interaction step diagram of the display method for the 3D model shopping interface in FIG. 1.

Here, a detailed description of the exemplary embodiments will be provided, with examples shown in the drawings. When the following description involves drawings, the same numbers in different drawings represent the same or similar elements unless otherwise indicated. The embodiments described in the following exemplary embodiments do not represent all embodiments that are the same as the present application. On the contrary, they are merely examples of devices and methods identical to some aspects of the present application as detailed in the appended claims.

In the embodiments of the present application, the term "module" or "unit" refers to a computer program or a part of a computer program with a predetermined function, which works together with other related parts to achieve a predetermined goal and can be fully or partially implemented by using software, hardware (such as processing circuit or memory) or their combination. Similarly, one processor (or more processors or memories) can be used to implement one or more modules or units. In addition, each module or unit can be part of an overall module or unit containing the functions of that module or unit.

Meanwhile, if user-related data is involved, user permission or consent must be obtained when the embodiments of the application are applied to specific products or technologies, and the collection, use and processing of relevant data must comply with the relevant laws, regulations and standards of the relevant countries and regions.

The block diagrams shown in the drawings are merely functional entities and do not necessarily correspond to physically independent entities. These functional entities can be implemented in software form, or in one or more hardware modules or integrated circuits, or in different network and/or processor devices and/or microcontroller devices.

Refer to FIG. 1, which is a main process diagram of a display method for a 3D model shopping interface in an embodiment of the invention.

The method in FIG. 1 comprises steps S100-S400, and the specific implementation of each step is as follows:

S100: display at least one candidate shopping target on the display interface of the electronic device in response to shopping search keywords entered by the user;

S200: enter a 3D model shopping display interface in response to the user's selection of the first candidate shopping target, and display an overall surface framework diagram of the first candidate shopping target on the 3D model shopping display interface;

S300: if the first interactive operation of the user on a first local position of the overall surface framework diagram of the first candidate shopping target is detected, download a first data packet corresponding to the first local position from the server;

S400: if no second interactive operation on a second local position of the overall surface framework diagram of the first candidate shopping target is detected during the period from the start of downloading the first data packet from the server to the completion of downloading, parse the first data packet and display the parsing result thereof on the display interface of the electronic device.

It can be seen that the method in FIG. 1 comprises a plurality of user interactive operations, and different user interactive operations correspond to different output results.

FIG. 2 further shows a user interaction step diagram of the display method for the 3D model shopping interface in FIG. 1.

For the convenience of description, the embodiment of FIG. 2 introduces parameter tags for description.

First, the user enters the shopping search keywords, and at least one candidate shopping target is displayed on the display interface of the electronic device;

For example, the shopping search keywords entered by the user can be "men's shoes, sports", "men's shoes, casual", "sports shoes", "casual shoes", etc.

The electronic device is equipped with a 3D model shopping application.

In response to the above-mentioned shopping search keywords entered by the user, a plurality of candidate shopping targets $\{Om_1, Om_2, \ldots, Om_k\}$ are displayed on the display interface of the 3D model shopping application of the electronic device, and $k>1$.

At this point, the user may be interested in the $i^{th}$ shopping target $Om_i$. Therefore, click on the $i^{th}$ shopping target $Om_i$, to enter the corresponding product display interface.

S720: enter the 3D model shopping display interface in response to the user's selection of the candidate shopping target $Om_i$, and display the overall surface framework diagram $SK_i$ of the candidate shopping target $Om_i$ on the 3D model shopping display interface; $1 \leq i \leq k$.

In the prior art, in order to present the shopping target in more detail, once the user selects a specific product and enters the product page, the 3D model shopping application will display all the information of the product, including planar information, three-dimensional information, texture, color, lighting and global/local information, which are downloaded to the local machine and then parsed and displayed.

When the electronic device at the user side has sufficient resources and the network transmission path between the user side and the server is very smooth, the above processing method can certainly bring a better experience to the user.

However, in practical applications, the resource capabilities of electronic devices used by different users vary, and there are also significant differences in hardware configurations, software configurations, etc. More importantly, users operate in ever-changing environments where the available data transmission channels (e.g., bandwidth, speed, etc.) are constantly changing. In most cases, both device resources and external broadband resources are constrained. If all the information is displayed immediately once a user clicks on the product page, obvious lag and delay may occur during product information display, affecting the user experience. Users may exit the current page after feeling the obvious lag, resulting in user churn and low shopping conversion rate.

Therefore, as the first improvement of the technical proposal of the invention, enter a 3D model shopping display interface in response to the user's selection of the first candidate shopping target, and display an overall surface framework diagram of the first candidate shopping target on the 3D model shopping display interface.

The overall surface framework diagram is a 3D framework vector diagram of the candidate shopping target, and the 3D framework vector diagram only shows the surface appearance vector data diagram of the candidate shopping target.

Take the user's selection of candidate shopping target $Om_i$ as shown in FIG. 2 as an example, enter the 3D model shopping display interface, and the overall surface framework diagram $SK_i$ of the candidate shopping target $Om_i$; $1 \leq i \leq k$.

The overall surface framework diagram $SK_i$ comprises N vector structure points $\{Vp_{i1}, Vp_{i2}, \ldots, Vp_{iN}\}$; each vector structure point $Vp_{ij}$ corresponds to at least one data packet to be parsed, and each data packet to be parsed corresponds to different levels of hardware resource configuration; $1 \leq j \leq N$.

For a better description of the above embodiments, further refer to FIG. 3. FIG. 3 is an overall surface framework diagram of a candidate shopping target at different angles in the technical proposal of the invention.

FIG. 3 shows the overall surface framework diagrams of a certain product (i.e., the shopping target) at three different angles, that is, the 3D framework vector diagrams at three different angles.

It can be seen that FIG. 3 shows a 3D framework vector diagram, which only contains a 3D framework composed of points, lines and surfaces. Of course, in the actual display page, corresponding color images can also be included (FIG. 3 is a black-and-white diagram, so different color combinations cannot be displayed).

However, the 3D framework color diagram composed of points, lines and surfaces shown in FIG. 3 only needs to display a very small part of the product information. It focuses on the "overall framework" rather than internal details or local magnified details. Therefore, the volume of data to be loaded to display the picture in FIG. 3 is very small, a high-configuration electronic device or large-broadband data transmission channel is not required, delay or lag in visual display is not caused, and the diagram can be adapted to the configurations of the vast majority of electronic devices as well as basic data transmission environments.

Of course, in the case of a 3D framework diagram composed of points, lines and surfaces merely in a geometric sense, once the user performs necessary interactive operations such as zooming in or rotating, this geometric structure diagram will show obvious burrs (for example, after zooming in ten times from the original image, burrs will appear at the edges of the shoes) due to pixel resolution display, which also leads to deterioration of the user's visual experience. Therefore, the 3D framework diagram adopted by the invention is a 3D framework vector diagram.

Vector diagram, also known as object-oriented image or drawing image, is mathematically defined as a series of lines connected by points. Graphic elements in a vector file e are called objects. Each object is a self-contained entity, possessing attributes such as color, shape, outline, size and screen position.

The vector diagram is drawn according to geometric characteristics. A vector can be a point or a line. The vector diagram can only be generated by software, and the file occupies less internal space because this type of image file contains independent separate images that can be freely recombined without restrictions. Its feature is that the image is not distorted when magnified, which is independent of resolution. The vector diagram is suitable for graphic design, text design, logo design, layout design, etc.

It can be seen that like ordinary geometric structure diagrams, the vector diagrams are composed of points, lines and surfaces, but the vector diagrams are obtained through mathematical formula calculations and have the characteristic of non-distortion after editing.

Geometric figures in the vector diagrams can be infinitely enlarged without discoloration or blurring. They are often used in pattern, logo, VI, text and other designs.

By using the vector diagrams to draw the 3D framework of the product, the file occupies less internal space and can also be displayed on the output device at the highest resolution, as each vector object is an independent and separate image, the loading speed is fast, and no delay in data display is caused.

Further, the overall surface framework diagram $SK_i$ comprises N vector structure points $\{Vp_{i1}, Vp_{i2}, \ldots, Vp_{iN}\}$; each vector structure point $Vp_{ij}$ corresponds to at least one data packet to be parsed, and each data packet to be parsed corresponds to different levels of hardware resource configuration; $1 \leq j \leq N$.

Vector structure points are point objects constituting the above-mentioned vector diagram.

As one of the further improvements of the invention, the vector structure points represent multiple local positions of the current candidate shopping target $Om_i$;

For instance, the overall surface framework diagram $SK_i$ of the men's shoes shown in FIG. 3 may include at least three vector structure points, which are respectively located at local positions such as toe (toe cap, shoe top, assumed to be), quarter (middle of the outer side of the shoe) and heel (inner side of the heel).

When the user performs an interactive operation (such as zooming in after clicking on the first local position, rotating after hitting the first local position, dragging on the first local position, etc.) on one of these three local positions, it means that the user may expect to see more details of that local position, or of course, it may just be a random click operation by the user.

As the current display only shows the overall surface framework diagram $SK_i$ of the men's shoes, more local detail information is not loaded. At this time, if the first interactive operation of the user on the first local position of the overall surface framework diagram of the first candidate shopping target is detected, the first data packet corresponding to the first local position needs to be downloaded from the server.

In the technical proposal of the invention, each vector structure point $Vp_{ij}$ corresponds to at least one data packet to be parsed, and each data packet to be parsed corresponds to different levels of hardware resource configuration; $1 \leq j \leq N$.

Taking the heel (the inner side of the heel) as the local position as an example, the vector structure points at this local position may correspond to data packets with at least three configurations to be parsed. Assume they are divided into low-configuration data packets, medium-configuration data packets and high-configuration data packets, respectively corresponding to low-configuration electronic devices, medium-configuration electronic devices and high-configuration electronic devices.

It should be pointed out that the terms "low configuration, high configuration, and medium configuration" mentioned here refer to the current available resources of electronic devices. The corresponding available resource threshold standards can be preestablished, such as "memory threshold range, broadband threshold range, storage space memory range". When the first interactive operation of the user on the first local position of the overall surface framework diagram of the first candidate shopping target is detected, obtain the current available resource range of the 3D model shopping application of the electronic device in real time, then determine the current configuration of the electronic device, and decide to download the data packet with the corresponding configuration to be parsed at that local location, so that the data download process is adapted to the user device, reducing lag and delay.

If the user does not have further interactive operations after the first interactive operation on the first local position of the overall surface framework diagram of the first candidate shopping target, it means that it is precisely the expectation to see more details of that local position, i.e., if no second interactive operation on a second local position of the overall surface framework diagram of the first candidate shopping target is detected during the period from the start of downloading the first data packet from the server to the completion of downloading, parse the first data packet and display the parsing result thereof on the display interface of the electronic device.

Figure 4:
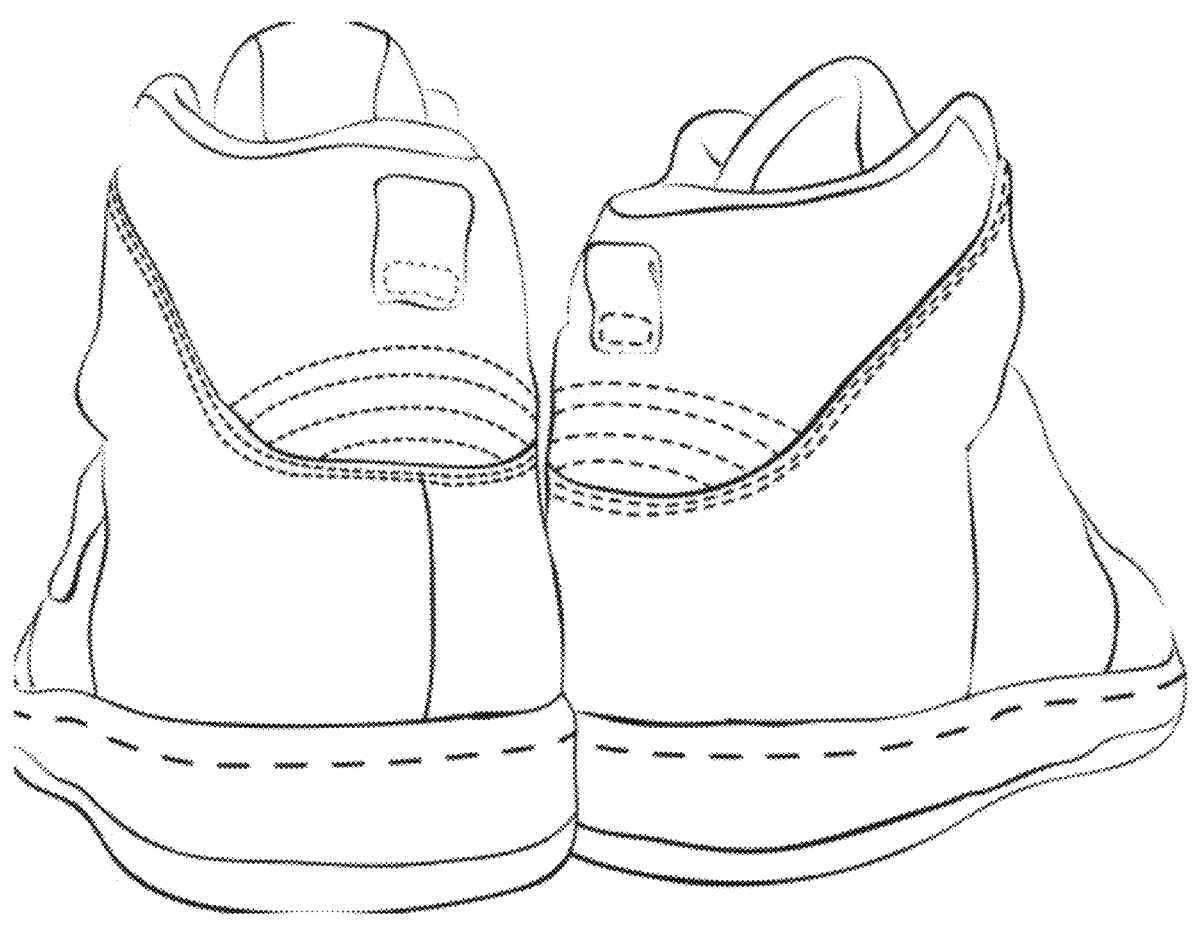
FIG. 4 is a detailed diagram for a local 3D model of a certain local position of the candidate shopping target in the technical solution of the invention.

Refer to FIG. 4. FIG. 4 is a detailed diagram for a local 3D model of a certain local position of the candidate shopping target in the technical solution of the invention.

At this point, the local position clicked by the user is the heel (the inner side of the heel) after the overall surface framework diagram is shown in FIG. 3. At this time, the first data packet corresponding to the first local position, the heel (the inner side of the shoe tail), is downloaded from the server and then parsed and displayed. The first data packet of the first local position of the heel (the inner side of the heel) can show more detailed images of the heel (the inner side of the heel).

It can be seen that in the invention, the target data packet at the corresponding position is only downloaded after the user's tendency to possibly observe a certain detail is detected; furthermore, the data packet is parsed and loaded only when the user is truly interested in the local position, avoiding unnecessary data transmission and data parsing processes, and making the corresponding data download and parsing more targeted.

In another aspect, if the second interactive operation of the user on the second local position of the overall surface framework diagram of the first candidate shopping target is detected during the period from the start of downloading the first data packet from the server to the completion of downloading, download the second data packet corresponding to the second local position while continuing to download the first data packet.

At this point, when the user's tendency to observe multiple details is continuously detected (but it is not sure which local position the user ultimately needs to observe), the above-mentioned method of the invention merely continuously downloads data and does not rush to perform data parsing and display.

If no second interactive operation of the user on a third local position of the overall surface framework diagram of the first candidate shopping target is detected during the period from the start of downloading the second data packet from the server to the completion of downloading, parse the second data packet and display the parsing result thereof on the display interface of the electronic device.

At this point, the user's interactive operation has stopped, meaning that the user has determined exactly which position they need to observe. Therefore, only the data that has been downloaded at the corresponding local position is parsed and displayed.

Based on the above introduction, it can be seen that the overall surface framework diagram in the form of vector diagram in the initial stage only shows the vector data diagram of the surface appearance of the first candidate shopping target, so that the data loading speed is faster, and no burrs occur when the user subsequently zoom in and rotate the structure diagram. If the user's need to observe multiple details is continuously detected (but it is not sure which local position the user ultimately needs to observe), the above-mentioned method of the invention merely continuously downloads data and does not rush to perform data parsing and display, thus saving the repetitive data parsing and display process. If the user's interactive operation has stopped, it means that the user has determined exactly which position they need to observe. Therefore, only the data that has been downloaded at the corresponding local position is parsed and displayed, making the finally displayed result more in line with the user's current expectations and reducing the delay and lag in data interactive display.

In combination with FIG. 1 to FIG. 4, the preferred embodiment of a display method for a 3D model shopping interface in the invention is introduced as follows:

S1: display at least one candidate shopping target on the display interface of the electronic device in response to shopping search keywords entered by the user;

S2: enter a 3D model shopping display interface in response to the user's selection of the first candidate shopping target, and display an overall surface framework diagram of the first candidate shopping target on the 3D model shopping display interface;

the overall surface framework diagram is a 3D framework vector diagram of the candidate shopping target, and the 3D framework vector diagram only shows the surface appearance vector data diagram of the candidate shopping target;

the overall surface framework diagram comprises N vector structure points; each vector structure point corresponds to at least one data packet to be parsed, and each data packet to be parsed corresponds to different levels of hardware resource configuration;

S300: if the first interactive operation of the user on a first local position of the overall surface framework diagram of the first candidate shopping target is detected, download a first data packet corresponding to the first local position from the server;

the first interactive operation of the user on the first local position of the overall surface framework diagram of the first candidate shopping target includes zooming operation after the user clicks on the first local position, rotation operation after the user hits the first local position, and dragging operation of the user on the first local position.

Specifically, in S3, starting downloading the first data packet corresponding to the first local position from the server specifically comprising the following steps:

determine target vector structure points based on the first local position;

determine at least one type of data packet to be parsed corresponding to the target vector structure point from the server;

determine the first data packet from the data packets to be parsed based on the current resource configuration of the electronic device; the first data packet is matched with the currently available resources of the electronic device;

start downloading the first data packet.

S4: if no second interactive operation on a second local position of the overall surface framework diagram of the first candidate shopping target is detected during the period from the start of downloading the first data packet from the server to the completion of downloading, parse the first data packet and display the parsing result thereof on the display interface of the electronic device;

if the second interactive operation of the user on the second local position of the overall surface framework diagram of the first candidate shopping target is detected during the period from the start of downloading the first data packet from the server to the completion of downloading, download the second data packet corresponding to the second local position while continuing to download the first data packet;

if no second interactive operation of the user on a third local position of the overall surface framework diagram of the first candidate shopping target is detected during the period from the start of downloading the second data packet from the server to the completion of downloading, parse the second data packet and display the parsing result thereof on the display interface of the electronic device.

Part or all of the steps of the display method for the 3D model shopping interface in the above-mentioned embodiment can be automatically realized through various forms of electronic devices and computer program instructions; the computer program instructions can be stored in different forms of storage media and loaded into a computer electronic device for execution.

Figure 5:
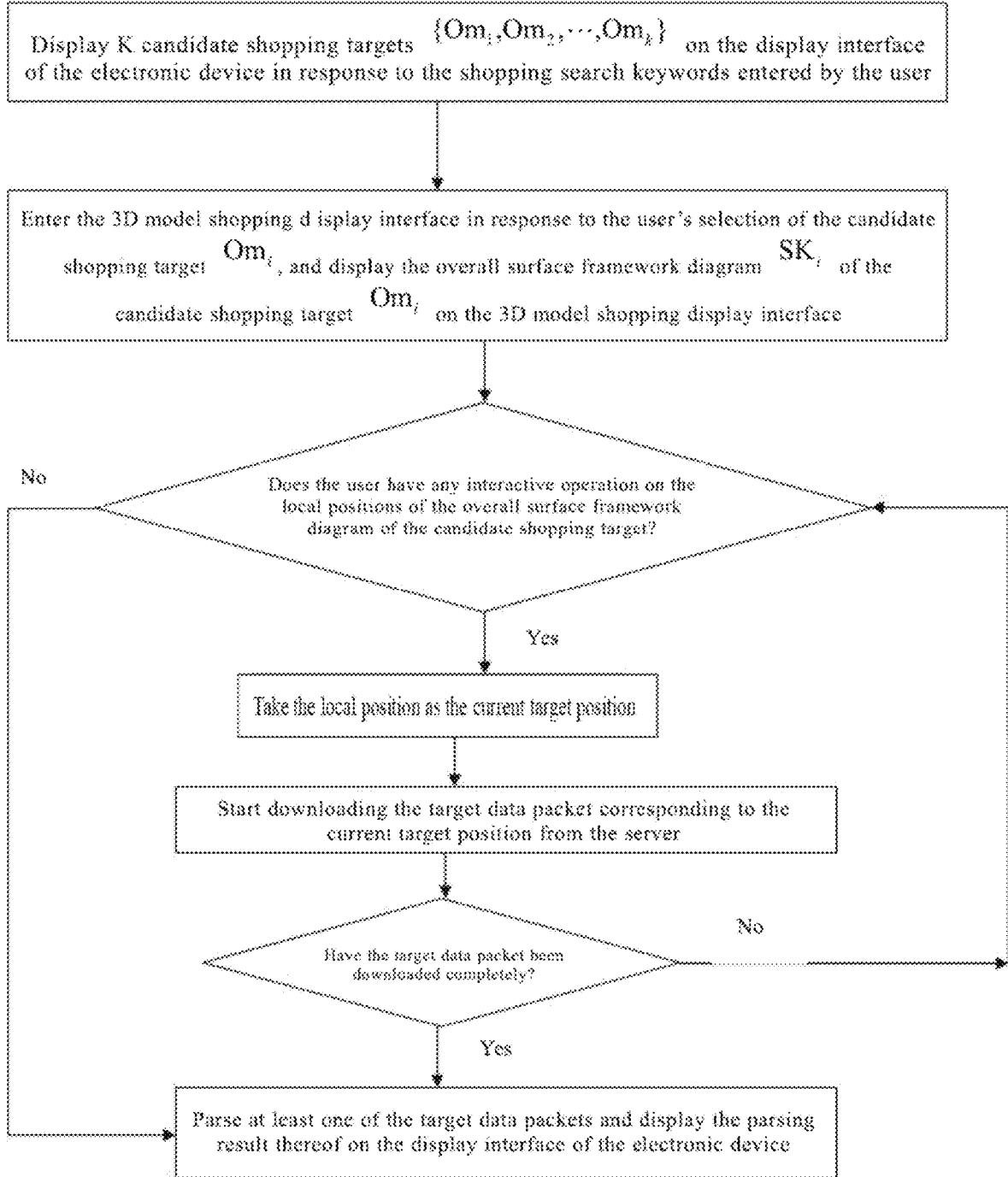
FIG. 5 is a schematic diagram for the computer flow implementation of a display method for a 3D model shopping interface in an embodiment of the invention.

When the computer electronic device is used for implementation based on computer program instructions, the display method can be implemented in the following pseudo-code language form of the computer program as shown in FIG. 5 (in FIG. 5, the step numbers are omitted and the descriptions of some steps are simplified):

S710: display K candidate shopping targets $\{Om_1, Om_2, \ldots, Om_k\}$ on the display interface of the electronic device in response to the shopping search keywords entered by the user, and k>1;

S720: enter the 3D model shopping display interface in response to the user's selection of the candidate shopping target $Om_i$, and display the overall surface framework diagram $SK_i$ of the candidate shopping target $Om_i$ on the 3D model shopping display interface; $1 \le i \le k$;

the overall surface framework diagram $SK_i$ comprises N vector structure points $\{Vp_{i1}, Vp_{i2}, \bullet \bullet \bullet, Vp_{iN}\}$; each vector structure point $Vp_{ij}$ corresponds to at least one data packet to be parsed, and each data packet to be parsed corresponds to different levels of hardware resource configuration; $1 \le j \le N$.

S730: judge whether the user has any interactive operation on the local positions of the overall surface framework diagram $SK_i$ of the candidate shopping target $Om_i$;

if any, take the local position as the current target position and proceed to S740;

if not, proceed to S760;

S740: start downloading the target data packet corresponding to the current target position from the server;

S750: return to execute S730 during the download of the target data packet;

S760: parse at least one of the target data packets and display the parsing result thereof on the display interface of the electronic device; the parsing result includes a local 3D model detail map for the candidate shopping target $Om_i$ at the current target position.

the step S750 also comprises the following step:

skip to S760 after the target data packets are downloaded.

The steps of the method or algorithm described in the embodiments disclosed herein can be directly implemented using a hardware or software module executed by the processor, or a combination of both. The software module can be placed in a random access memory (RAM), a memory, a read-only memory (ROM), an electrically programmable ROM, an electrically erasable programmable ROM, a register, a hard disk, a removable disk, a CD-ROM or any other form of storage medium known in the technical field.

Figure 6:
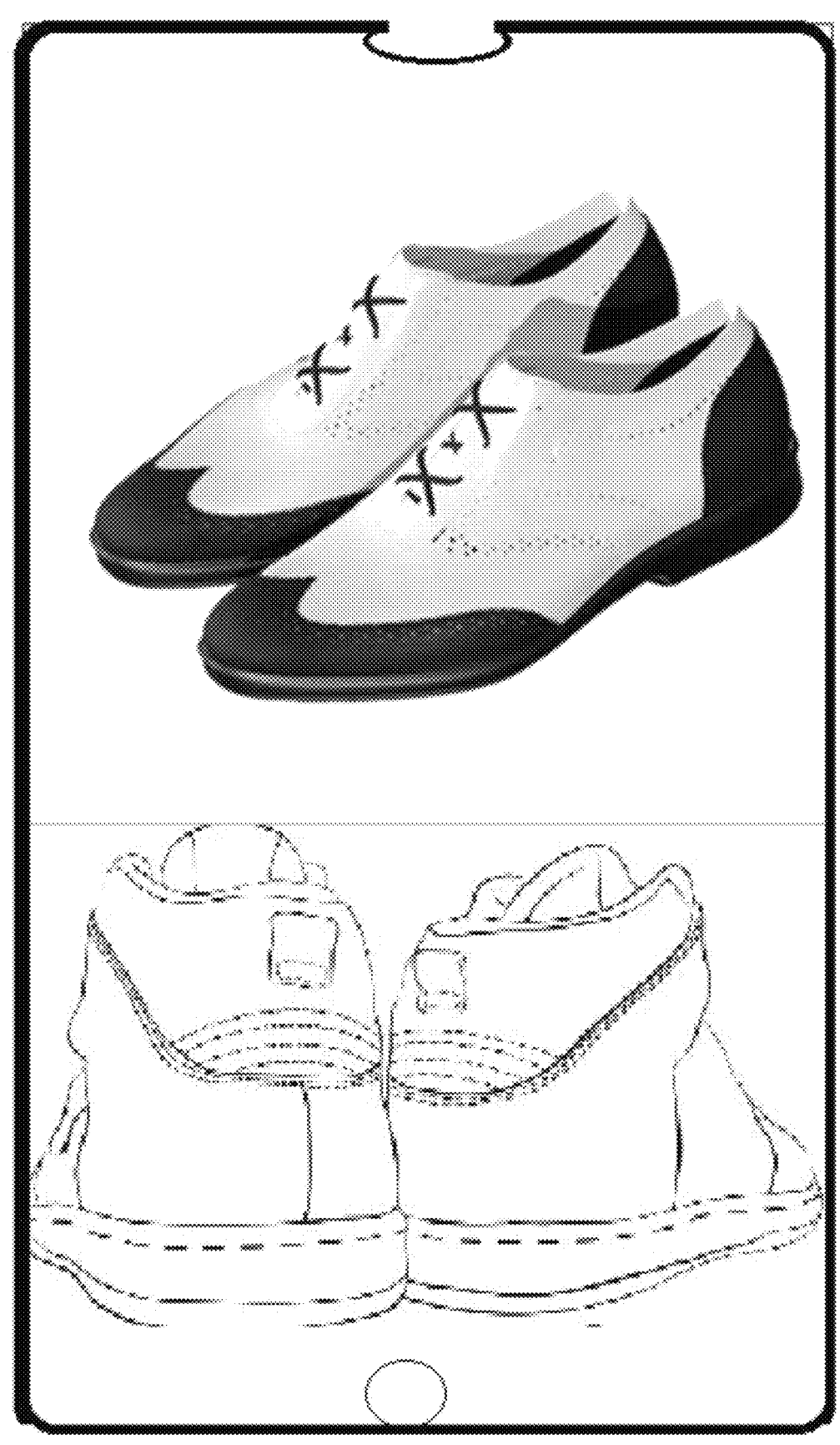
FIG. 6 is a schematic diagram for an interactive interface of an electronic device for realizing the display method for 3D model shopping interface in the invention.

FIG. 6 is a schematic diagram for an interactive interface of an electronic device for realizing the display method for 3D model shopping interface in the invention. The electronic device comprises a computer-readable storage medium, on which a computer program is stored. The computer program implements the steps of the display method for the 3D model shopping interface in the above embodiments when being executed by the electronic device comprising the processor.

The electronic device shown in FIG. 6 can be configured with the customization system of in the invention, and the customized system is configured with a 3D model shopping application, which is installed on an electronic device for displaying the 3D model shopping interface.

In the interactive interface shown in FIG. 6, the visualization interface is divided into upper part and lower part. The upper part shows the overall surface framework diagram of a certain candidate shopping target. Users can perform touch interaction with the overall surface framework diagram through interactive operations (such as finger interaction on the touchscreen), such as rotating, clicking, zooming in, etc.

When the user continuously clicks on multiple local positions (for example, continuously click on the toe, quarter and heel of the shoe), multiple interactive operations of the user on multiple local positions of the overall surface framework diagram of the first candidate shopping target are detected. At this time, the method continuously downloads the first data packet (toe), the second data packet (quarter) and the third data packet (heel) corresponding to the multiple local positions from the server, but does not immediately parse and display them.

When the user stops the interactive operations (for example, the user clicks on the heel and then does not continue to click), it means that the user expects to see more detailed information about the local position, the heel. At this time, as the third data packet corresponding to the heel position has been downloaded previously, the 3D model shopping application can parse the heel data packet to display more detailed information about the local position, the heel, as shown in the lower half of FIG. 6.

Of course, if the user continues to return to the toe position of the shoe, the 3D model shopping application can parse the heel data packet to display more detailed information about the local position, the toe, as the first data packet corresponding to the toe position has been downloaded previously.

Compared with the information display method of the prior art that all information is loaded/displayed in real time and loaded once per click and the current available resource configuration of the user device is not considered, the technical proposal of the invention can reduce the lag and delay phenomena in the interactive display of the 3D model shopping interface, adapt to user devices and thereby enhance the user's shopping experience.

Figure 7:
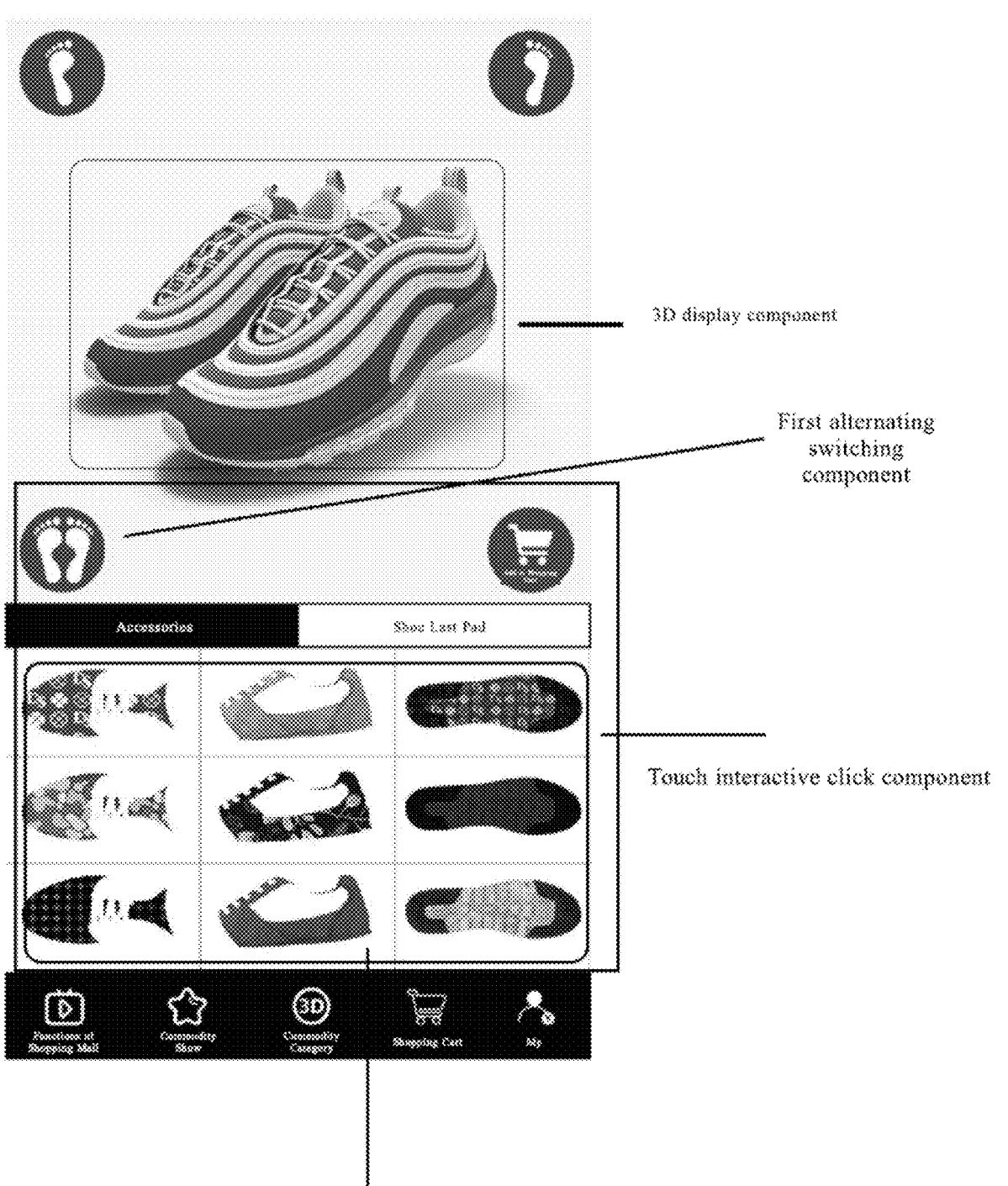
FIG. 7 is a schematic diagram for the functional structure and display effect of a 3D model shopping interface display system in an embodiment of the invention.

Based on the introduction of the above embodiments, FIG. 7 shows a schematic diagram for the functional structure and display effect of a 3D model shopping interface display system in an embodiment of the invention.

In FIG. 7, a display system for a 3D model shopping interface presents a 3D model shopping interface through an APP and further comprises:

a 3D display component, which is used to display a 3D stereoscopic rotatable structure picture of a candidate shopping target;

in FIG. 7, taking this page as an example, when the page is opened, a pair is initially displayed at the angle on the left;

software architecture of 3D display function 1. for each pair of shoes, build 3D models first on other software based on the actual shoes produced, including the sole, the components of the upper, the shoelaces, the lining, the insole, etc., and each accessory is an independent 3D model.

2. in the APP software, based on the 3D models of the entire pair of shoes, other accessories are switched on the 3D models of the entire shoe when the user selects the color of the accessories.

a touch interactive click component, which comprises a first alternating switching component and a second selective component.

When the first alternating switching component is clicked, pairing effects of the candidate shopping target in at least two different states are alternately displayed on the shopping interface.

Take FIG. 7 as an example, just click on the picture, then the color for a pair is displayed, but the icons for the single foot and both feet in the 3D display box are not shown.

When the first alternating switching component is clicked, the pairing effects of the candidate shopping target in at least two different states are alternately displayed on the shopping interface, namely the color pattern effect of the left foot and the color pattern effect of the right foot.

The second selective component comprises nine-grid display sub-components, each of which corresponds to a recommended color matching mode or a custom color matching mode.

This page is divided into two parts. The upper part is a 3D display window. The lower part is to display the matching components of the shoes in a nine-square grid format. When the user clicks on the corresponding matching components, the nine-square grid changes to multiple types of shoes under this category.

When the user clicks on the shoes they want to see, the 3D display window above shows the basic colors of the shoes.

When one of the display sub-components is clicked, the display effect of the candidate shopping target in the corresponding color matching mode corresponding to the display sub-component is displayed on the shopping interface;

When the user clicks on the custom color matching mode and then selects the accessory, the accessory directly matches the 3D model above, and the model automatically rotates to the best display angle of the accessory.

Other interactive click operation modes include:

Only when the user clicks on the custom color, the pictures the various accessories on the left are displayed. The icons of a single foot and both feet within the 3D display box are displayed.

When the user clicks on the left foot, the icon changes color. When the user clicks on the accessory below again, the left shoe of the 3D model above directly switches color.

When the user clicks on the right foot, the icon changes color. When the user clicks on the accessory below again, the right shoe of the 3D model above directly switches color.

When the user clicks on both feet, the icon changes color. When the user clicks on the accessory below again, the shoes of the 3D model above switch color synchronously.

The APP is used for implementation. The APP mobile software is a dedicated shopping platform software for shoes and clothing. Its main function is to display products in 3D stereoscopic form on the APP and to show them in 360 degrees without blind spots.

After entering the specific style selection page, click "Recommended Color" in the middle menu bar, and then the button changes color. The nine-square grid below shows the basic colors recommended by the merchant. Click on the color you want to see, and the 3D exhibition above shows the details of the shoes; touch by hand to rotate the 3D display frame screen by 360 degrees to view details, and zoom in and out of the 3D model with fingers on the screen of the 3D display area.

After entering the specific style selection page, click on "Custom Color" in the middle menu bar, and the button changes color. The nine-square grid below shows various colors of the optional accessories for this type of shoes. At this point, there is a left-foot icon in the upper left corner of the 3D display box, a right-foot icon in the upper right corner, and feet icon in the lower left corner. This software allows users to select accessories and color for individual shoe.

If the user wants to change the color of the accessory for a pair of shoes, first click on the feet icon at the lower left corner. Then click on the color of the accessory below. The 3D display above will change the color of the corresponding position of the accessory in pairs.

If the user wants to change the accessory color of a shoe, first click on the single-feet icon in the upper left or upper right corner. The 3D display above will change the color of the corresponding position of the accessory.

In the 3D customization mode page, the user can also select colors and materials of different positions for the left and right shoes respectively. After confirming through the 3D display, the user purchases and enters the normal shopping process (Add to Shopping Cart button component in FIG. 7).

After entering the selection page of a specific style, click on "Shoe Last Pad" in the middle menu bar, and the button changes color. In addition to providing users with normal insole accessories, this APP platform also offers different types of insoles for various arches. Users can choose different sizes and different colors for the left and right feet, etc., and even different palm widths for left and right feet.

Corresponding to the embodiments of the aforementioned method, in order to reduce the lag and delay phenomena in the interactive display of the 3D model shopping interface, adapt to user devices and thereby enhance the user's shopping experience, the display system also comprises a candidate shopping target interaction detection component;

the candidate shopping target interaction detection component is used to detect the user interaction on the local position of an overall surface framework diagram of the candidate shopping target;

if the first interactive operation of the user on the first local position of the overall surface framework diagram of the first candidate shopping target is detected, the APP starts downloading the first data packet corresponding to the first local position from the server;

if no second interactive operation of the user on the second local position of the overall surface framework diagram of the first candidate shopping target is detected during the period from the start of downloading the first data packet from the server to the completion of downloading, the first data packet is parsed and the parsing result thereof is displayed on the display interface of the APP.

The aforementioned sections provide multiple embodiments, each of which can constitute an independent technical proposal and may contribute to the prior art and address corresponding technical problems. However, it should be noted that different embodiments may be combined without violating logic. Meanwhile, each embodiment can solve at least one technical problem, but it is not required that each individual embodiment should address multiple or all technical problems.

Understandably, the principles and advantages of the system embodiments correspond to those of the method embodiments described in detail earlier, and thus will not be reiterated.

For other technologies, principles, algorithms or models not explicitly elaborated in the application, refer to the prior art.

While the method and system embodiments of the invention have been illustrated and described, those of ordinary skill in the art may make various changes, modifications, substitutions and variations may be made to these embodiments without departing from the principles and spirit of the invention. The scope of the invention is defined by the appended claims and their equivalents.

The invention claimed is:

1. A display system for a three dimensional (3D) model shopping interface, presenting a 3D model shopping interface through an application (APP), characterized in that the display system further comprises:

a touch interactive click component, which comprises a first alternating switching component and a second selective component;

wherein the display system is configured to display a 3D stereoscopic rotatable structure picture of a candidate shopping target;

when the first alternating switching component is clicked, two separate pairing effects of the candidate shopping target are displayed on the shopping interface at the same time;

wherein the second selective component comprises nine-grid display sub-components, each of which corresponds to a recommended color matching mode or a custom color matching mode;

when one of the display sub-components is clicked, a display effect of the candidate shopping target in a corresponding color matching mode corresponding to the display sub-component is displayed on the shopping interface;

the display system is further configured to detect a user interaction on a local position of an overall surface framework diagram of the candidate shopping target; wherein the overall surface framework diagram is a 3D framework vector diagram; wherein the 3D framework vector diagram only shows a surface appearance vector data diagram of the candidate shopping target;

if a first interactive operation of the user on a first local position of the overall surface framework diagram of a first candidate shopping target is detected, the APP starts downloading a first data packet corresponding to the first local position from a server;

if no second interactive operation of the user on a second local position of the overall surface framework diagram of the first candidate shopping target is detected during a period from a start of downloading the first data packet from the server to a completion of downloading, the first data packet is parsed and a parsing result thereof is displayed on a display interface of the APP.

* * * * *